Figure 1:
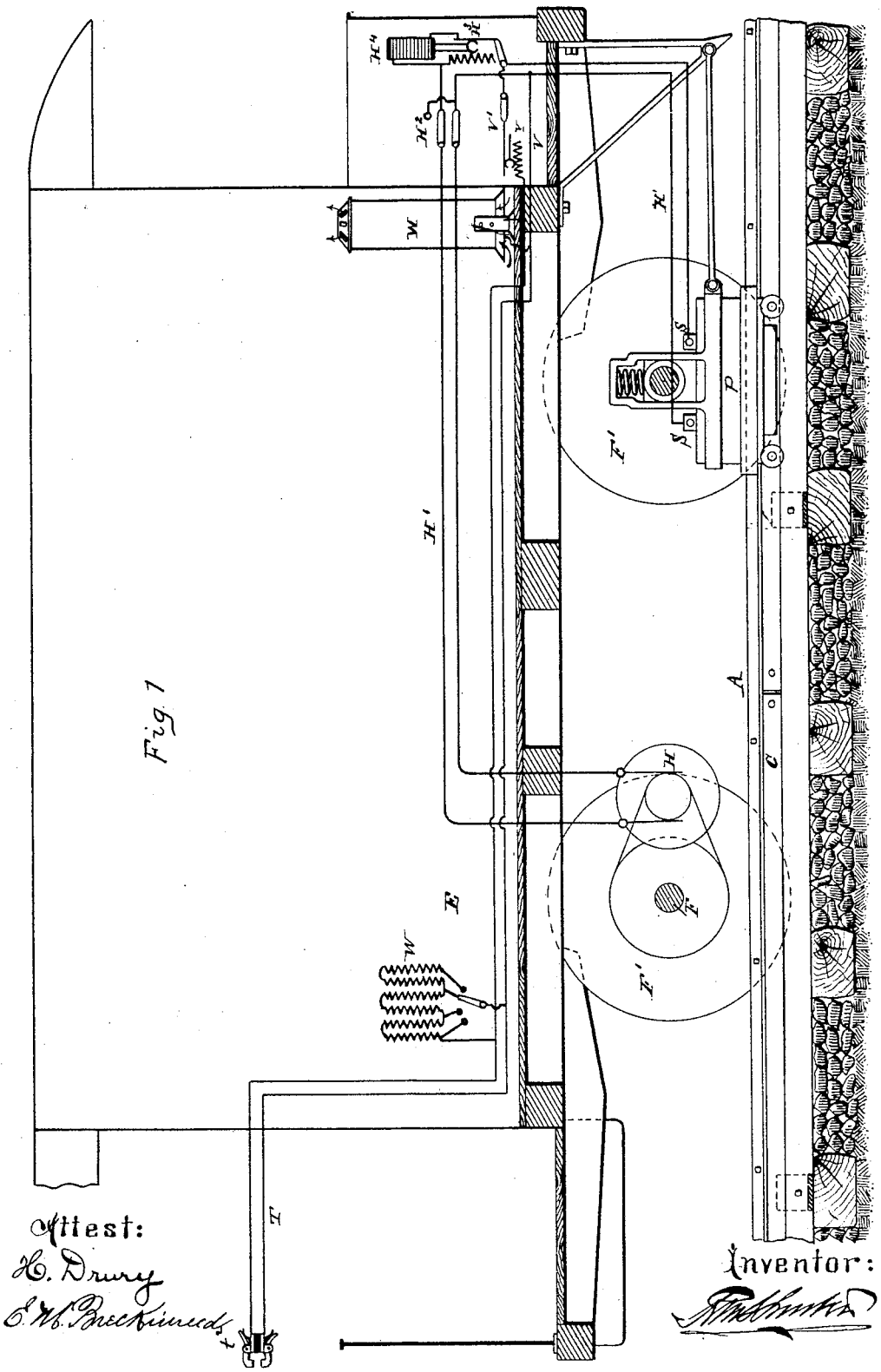

(No Model.) 2 Sheets—Sheet 1.
R. M. HUNTER.
HEATING AND LIGHTING SYSTEM.

No. 462,926. Patented Nov. 10, 1891.

Attest:
H. Drury
E. W. Breckinridge

Inventor:
R. M. Hunter (No Model.) 2 Sheets—Sheet 2.
R. M. HUNTER.
HEATING AND LIGHTING SYSTEM.
No. 462,926. Patented Nov. 10, 1891.
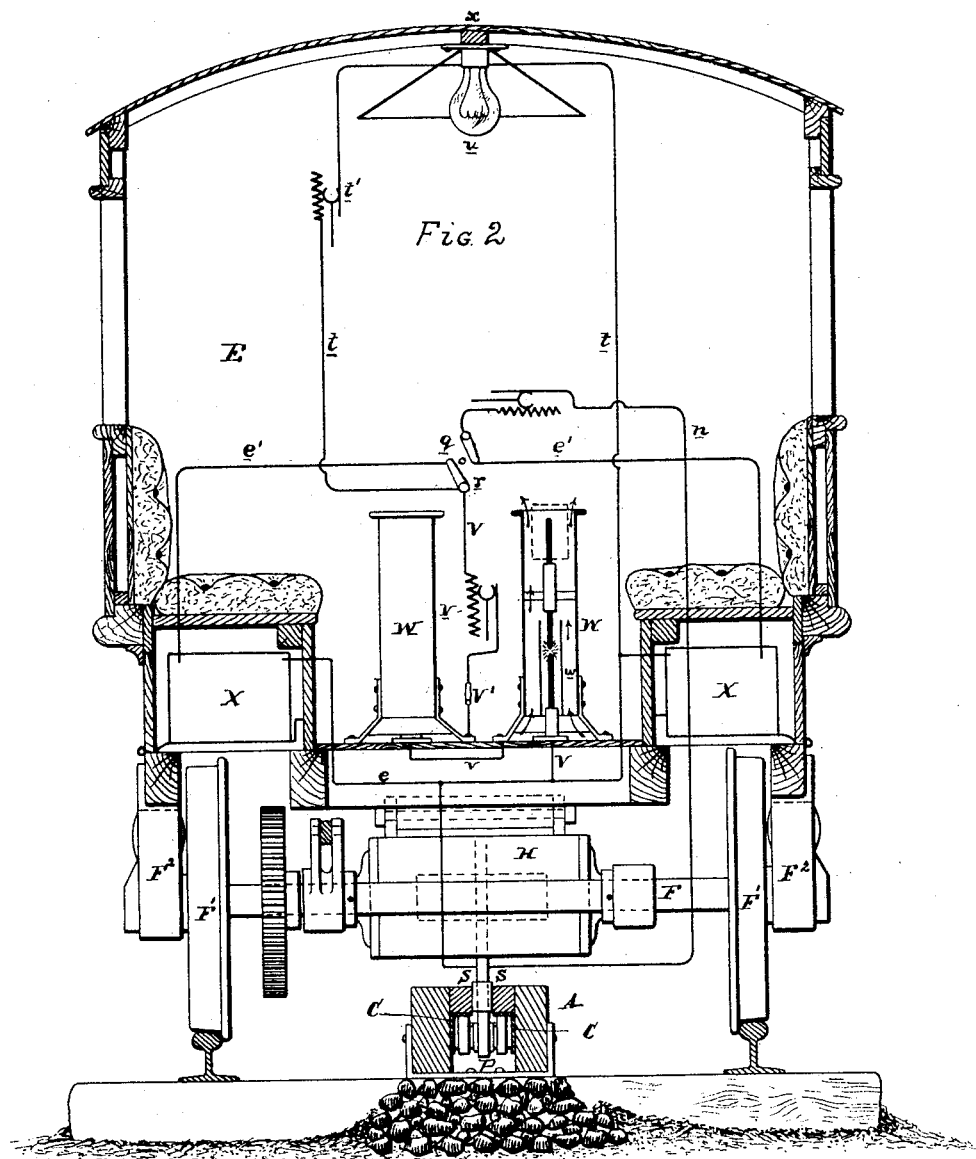
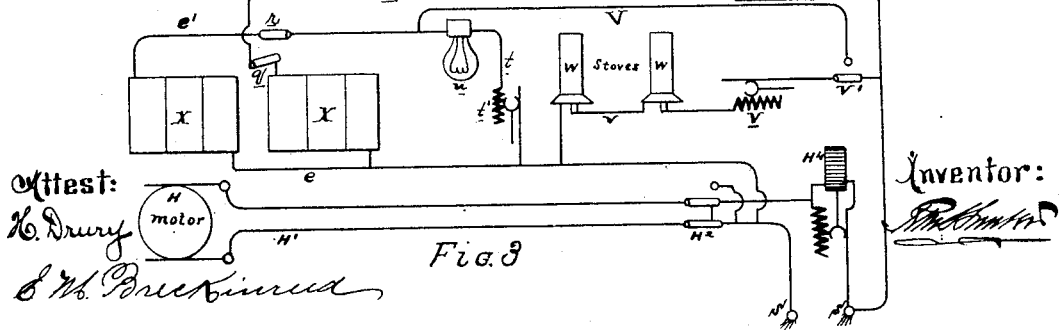
Attest:
H. Drury
E. M. Breckinridge
Inventor:
R. M. Hunter

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

HEATING AND LIGHTING SYSTEM.

SPECIFICATION forming part of Letters Patent No. 462,926, dated November 10, 1891.

Original application filed January 12, 1887, Serial No. 224,150. Divided and this application filed September 27, 1887. Serial No. 250,842. (No model.)

*To all whom it may concern:*

Be it known that I, RUDOLPH M. HUNTER, of the city and county of Philadelphia, and State of Pennsylvania, have invented an Improvement in Heating and Lighting Electric-Railway Cars, of which the following is a specification.

My invention has reference to electric railways; and it consists in certain improvements, all of which are fully set forth in the following specification and shown in the accompanying drawings, which form part thereof.

The essential features of this application may be enumerated as follows:

First. The car is provided with electric stoves to heat it in cold weather. The current for this purpose may be from the line conductors or from storage-batteries on the car under the seats. The temperature of these stoves can be easily regulated by suitable resistances or by changing the strength of the current of the batteries. They may be in direct or shunt circuit with reference to the motors, the latter being preferred.

Second. The car is lighted by electricity derived from the storage-batteries, and these batteries are two in number, of any number of cells each, and are alternately charged, preferably, by the line-circuit without removing them from the car.

It is immaterial to my invention, broadly considered, what the source of electric power may be, as is also the specific construction of heater and regulator and their location on the car.

The foregoing are the essential features of the invention; but there are many details fully set out hereinafter.

This application is a division of my application filed January 12, 1887, Serial No. 224,150.

In the drawings, Figure 1 is a sectional elevation of an electric railway and motor car embodying my invention. Fig. 2 is a cross-section of car, showing circuits, &c.; and Fig. 3 is a diagram showing the arrangement of circuits on the car.

A represents a conduit of any suitable construction and contains the two longitudinal conductors C C, which receive current from some stationary source.

P is the collector, which extends down into the conduit and makes a sliding or rolling contact with the conductors C, and may be hung from the car in any manner desired.

F are the axles and F' the wheels of the car.

E is the car-body, and H is the electric motor for driving the car, and may be made in any manner and connected as desired.

The upper ends of the conductors S S of the collector are the terminals of the motor-circuit H', which circuit is provided with the current-reverser H² and resistance-changer H³, which may be regulated by hand or made automatic, as shown, having a helix H⁴, which actuates the switch contact-core, said helix being in direct or shunt circuit. Any suitable form of regulator may be used.

Referring to Fig. 2, W represents an electric stove, which consists, essentially, of an arc lamp surrounded with a close sheet-iron casing, around which air-currents are caused to circulate through the annular passage-way $w$. There may be any number of these stoves coupled together in series or multiple arc and in a circuit V, arranged as a shunt or derived circuit with reference to the motor. This circuit V is provided with a circuit-breaker V' and a resistance-changer $v$ to control the amount of heating effect. The stoves may be of any suitable construction provided they be heated by electricity and may have suitable dampers to control the air-draft through them. In place of the arc stoves I may use resistance-stoves, as indicated in the left-hand part of Fig. 1.

Referring again to Fig. 2, X X' are two secondary batteries of any number of cells each and are placed under the car-seats or other suitable location. One terminal of the batteries is connected by conductor $e$ with one collector S, and the other terminal of said batteries connecting with the conductors $e'$ $e'$, either of which may be connected by switch $q$ with conductor $n$, communicating with the other by collector S. By this means either battery desired is connected with the line-conductors C for charging, and the other battery may be used for lighting purposes, heating, or propelling the car.

Referring to Fig. 2, $u$ is the electric lamp to light the car and is in a circuit $t$, having a resistance-changer $t'$, and may be coupled with either battery by a switch $r$. The stoves W are also supplied (in this figure) from the secondary batteries, being put in circuit with either battery X or X' by the switch $r$. By simply throwing the switches $r$ and $q$ onto the same contact the secondary batteries may be both cut out or the line-current may be divided, part passing through the secondary battery and part over the lighting or heating circuit or both.

The heating-circuit T, Fig. 1, may extend on back through the car and terminate in a coupling $t^2$ for supplying heating-current to another car.

Referring now to Fig. 3, which indicates the general arrangement of the circuits on the car above referred to, a better understanding of the construction will be had. It will be seen that the batteries X may be alternately coupled by the switch $q$ with circuit $n$, and thus be in multiple connection with the motor and collectors $s$ $s$; but when no current is passing from the line conductors the battery in circuit with the motor would be in series with it. The left-hand battery is in circuit with the lighting-circuit $t$ by switch $r$, and the right-hand battery X is shown as in circuit with the stoves W by circuit $e$ V $n$ and switch $q$; or the switch V' may be thrown up and put the stoves in circuit with the left-hand battery by circuits $e$ V $t$ $e'$ and switch $r$. The switch V' may be used to cut the stoves out of circuit, and the resistance-changer may be used to control the current flowing through them. When the parts are coupled as shown it will be seen that the stoves are in multiple connection with the motor and may receive current from the line-circuits or secondary batteries.

I do not limit myself to the details of construction, as they may be modified in various ways without departing from my invention.

I have described the general features of my invention and have shown many things which are not claimed for the purpose of making my invention more clear, and I wish it to be understood that any matters shown or described but not claimed are not dedicated to the public, but form subject-matter of other pending applications — for instance, Nos. 224,150, of 1887, 200,400, of 1886, 271,923, of 1888, and 220,240, of 1886. For instance, the collector and conduit are not claimed, as they form part of my application, Serial No. 224,150, of 1887; neither do I claim the storage-batteries contained within compartments under the seats, as that forms subject-matter of my divisional application, Serial No. 272,123, of 1888.

Having now described my invention, what I claim as new, and desire to secure by Letters Patent, is—

1. In an electric railway, the combination of a line working conductor arranged along the track, an electrically-propelled vehicle, a motor on said vehicle, two secondary batteries also on said vehicle, a current-collector carried by the vehicle to receive current from the line working conductor, a motor-circuit, a secondary-battery circuit in electrical connection with said motor-circuit, and switches to cut either battery out of circuit and disconnect it from the line-circuit, a local circuit carried by the vehicle, a switch to couple said circuit with either of the batteries, and translating or current-consuming devices in said local circuit.

2. In an electric railway, the combination of a line working conductor arranged along the track, an electrically-propelled vehicle, a motor on said vehicle, two secondary batteries also on said vehicle, a current-collector carried by the vehicle to receive current from the line working conductor, a motor-circuit, a secondary-battery circuit in electrical connection with said motor-circuit, and switches to cut either battery out of circuit and disconnect it from the line-circuit, a local circuit carried by the vehicle, a switch to couple said circuit with either of the batteries, and an electric lamp in said local circuit.

3. In an electric railway, the combination of a line working conductor arranged along the track, an electrically-propelled vehicle, a motor on said vehicle, two secondary batteries also on said vehicle, a current-collector carried by the vehicle to receive current from the line working conductor, a motor-circuit, a secondary-battery circuit in electrical connection with said motor-circuit, and switches to cut either battery out of circuit and disconnect it from the line-circuit, a local circuit carried by the vehicle, a switch to couple said circuit with either of the batteries, and an electric heater in said local circuit.

4. In an electric railway, the combination of an electrically-propelled vehicle, two secondary batteries on the vehicle, a motor-circuit, a local lighting-circuit, and switches for coupling the motor-circuit with one battery and lighting-circuit with the other battery.

5. The combination of a railway, a working conductor extending along the railway, a traveling vehicle, a current-collecting device moving with the vehicle and receiving current from the conductor, two secondary batteries on the vehicle, circuits for coupling either of the batteries in circuit with the collecting device, circuits carried upon the vehicle and receiving current from the secondary batteries, an electric heater to heat the vehicle, and an electric lamp to light the vehicle arranged in said circuits in multiple connection.

6. The combination of a railway, a working conductor extending along the railway, a traveling vehicle, a current-collecting device moving with the vehicle and receiving current from the conductor, two secondary batteries on the vehicle, circuits for coupling either of the batteries in circuit with the collecting device, circuits carried upon the vehicle and receiving current from the secondary batteries, an electric heater to heat the vehicle, and an electric lamp to light the vehicle arranged in said circuits in multiple connection, and independent means for controlling the current-supply to electric heater and the electric lamp.

7. The combination of a railway, a conductor extending along the railway, a traveling electrically-propelled vehicle, an electric motor to propel the vehicle, a current-collecting device moving with the vehicle and making a traveling connection with the conductor, two secondary batteries upon the vehicle, circuits connecting the collecting device with the electric motor and the batteries, whereby the said motor and batteries may receive current from the line conductor, and electric circuits upon the vehicle containing translating and current-consuming devices and means for coupling said circuits with either of the batteries.

8. The combination of a railway, a conductor extending along the railway, a traveling electrically-propelled vehicle, an electric motor to propel the vehicle, an electric heater to heat the vehicle, a current-collecting device moving with the vehicle and making a traveling connection with the conductor, circuits connecting the collecting device with the motor, an electric heater, and independent means for controlling the current passing to the motor and to the heater.

In testimony of which invention I hereunto set my hand.

RUDOLPH M. HUNTER.

Witnesses:
   E. M. BRECKINREED,
   ERNEST HOWARD HUNTER.